(12) United States Patent
Chang

(10) Patent No.: US 8,348,573 B2
(45) Date of Patent: Jan. 8, 2013

(54) VERSATILE FASTENER

(75) Inventor: Ching-Hsiang Chang, Tainan County 711 (TW)

(73) Assignee: Essence Method Refine Co., Ltd., Tainan County (TW)

( * ) Notice: Subject to any disclaimer, the term of this patent is extended or adjusted under 35 U.S.C. 154(b) by 141 days.

(21) Appl. No.: 12/732,638

(22) Filed: Mar. 26, 2010

(65) Prior Publication Data
US 2011/0229286 A1 Sep. 22, 2011

(51) Int. Cl.
*F16B 25/10* (2006.01)
(52) U.S. Cl. .............. 411/387.1; 411/386; 411/387.8; 411/412
(58) Field of Classification Search ............... 411/386, 411/387.1, 387.2, 387.3, 387.4, 387.5, 387.6, 411/387.7, 387.8, 399, 412
See application file for complete search history.

(56) References Cited

U.S. PATENT DOCUMENTS

| 684,774 | A | * | 10/1901 | Baggs | 411/386 |
| 4,874,278 | A | * | 10/1989 | Kawashita | 411/386 |
| 5,015,134 | A | * | 5/1991 | Gotoh | 411/386 |
| 7,393,170 | B2 | * | 7/2008 | Chen | 411/387.1 |
| 2007/0160440 | A1 | * | 7/2007 | Langewiesche | 411/386 |
| 2009/0028665 | A1 | * | 1/2009 | Chang | 411/387.3 |

* cited by examiner

*Primary Examiner* — Roberta Delisle
(74) *Attorney, Agent, or Firm* — Muncy, Geissler, Olds & Lowe, PLLC

(57) ABSTRACT

A versatile fastener including at least two flat areas formed on a cutting part, and an accommodating area disposed between any two of the flat areas. At least two cutting faces are convergent to form the accommodating area, and first and second cutting edges are respectively formed at a connection between each cutting face and flat area. In operation, the flat areas facilitate the first and the second cutting edges to promote a stable balance with the object, thereby allowing the debris to be swiftly guided out of the accommodating areas. Consequently, it is difficult to crack the object while imparting forces thereon, so as to lower the screwing resistance and the fastening torque as well as increase the combining efficiency.

12 Claims, 14 Drawing Sheets

VERSATILE FASTENER

BACKGROUND OF THE INVENTION

1. Field of the Invention

The present invention relates to a fastener, in particular to a versatile fastener that provides a preferable stability at the time of fastening and favorably decreases the screwing torque as well as the resistance.

2. Description of the Related Art

A conventional screw 1 shown in FIG. 1 generally comprises a shank 11, a head portion 12 disposed at one end of the shank 11, and a plurality of threads 13 spirally disposed on the shank 11. A free end 14 is formed at the other end of the shank 11. The free end 14 includes a guiding area 141 defined on the surface thereof as well as extensively formed in the connection with the threads 13, and a cutting edge 142 defined on a congregation formed by the guiding area 141, the free end 14, and the threads 13. In applying the screw 1 for fastening, the free end 14 of the screw 1 is propped against an object. Thence, the free end 14 leads the entire screw 1 to gradually screw into the object 2. The cutting edge 142 drills and chips the object 2, and the guiding area 141 guides the debris generated from the drilling. Accordingly, the screw 1 achieves the fastening and fixing function.

However, in practice, the conventional screw 1 merely utilizes the guiding area 141 and the cutting edge 142 formed on the free end 14 to implement the cutting and the debris guidance. Since, an included angle formed on the guiding area 141 is rather small, the accommodating area accordingly defined thereby is relatively confined. As a result, the debris generated at the time of screwing is readily retained in the guiding area 141, hence incurring a poor guiding effect. Moreover, such a screw 1 merely causes the threads 13 to provide multiple supporting points engaging the object 2. Therefore, if a rotating force is continuously executed on the screw 1, the debris will be adversely compressed in view of the unfavorable guiding effect. Additionally, the object 2 will readily sway because of the insufficient supporting force. As a result, the object 2 readily splits due to the overlarge screwing torque. The screw 1 also fails to provide a speedy screwing and influences the screwing effect.

Another conventional screw 3 is disclosed for removing the disadvantages of the conventional screw 1. Referring to FIG. 2, the screw 3 comprises a shank 31, a head portion 32, and a plurality of threaded portions 33 spirally disposed on the shank 31. A free end 34 is formed at one end of the shank 31, and a blank area 35 is formed between the threaded portion 33 and the free end 34. Further, a plurality of protruding ribs 351 are formed on the blank area 35. In screwing, the free end 34 is propped against an object 4, and thence the screw 3 is gradually screwed into the object 4 via a screwing force. By means of the protruding ribs 351 providing a reaming effect on the object 4, the screw 3 can succeed in achieving a swift drilling. Thence, a fastening and fixing effect is accomplished.

However, while the object 4 is reamed by the protruding ribs 351, the fibers of the object 4 are practically incompletely severed. As a result, the unsevered fibers adversely entangle the shank 31, thereby influencing the screwing speed of the screw 3. Therefore, a rather great driving force has to be further exerted on the screw 3 for smoothly screwing into the object 4. Consequently, the screw 3 has shortcomings which could be improved, i.e. a slower screwing speed, and a laborious screwing torque as well as a large resistance.

SUMMARY OF THE INVENTION

The object of the present invention is to provide a versatile fastener for avoiding an unstable drilling as well as a cracked object. Thereby, the screwing speed could be promoted, the driving torque could be decreased, and the screwing efficiency could be elevated.

The versatile fastener in accordance with the present invention mainly comprises a shank, a head portion as well as a drill point respectively disposed at two opposite ends of the shank, and a threaded portion spirally disposed on the shank. A cutting part with no threaded portion surrounding it is formed on the drill point. The cutting part includes at least two flat areas and an accommodation in the form of a recess disposed between any two flat areas at intervals. Moreover, the accommodating area has at least two connective cutting faces. Further, a first cutting edge and a second cutting edge are respectively formed at a convergence of each cutting face and the flat area. Thereby, the flat areas offer a stable supporting force while the first cutting edge and the second cutting edge are drilling into an object. Preferably, the drilled debris of the object could be speedily removed from the accommodating areas, thence preventing the object from a crack in view of a swaying screwing. Consequently, the screwing speed is promoted, the driving torque is dwindled, and the fastening efficiency is favorably encouraged.

The advantages of the present invention over the known prior arts will become more apparent to those of ordinary skilled in the art by reading the following descriptions with the relating drawings.

DETAILED DESCRIPTION OF THE PREFERRED EMBODIMENTS

Figure 1:
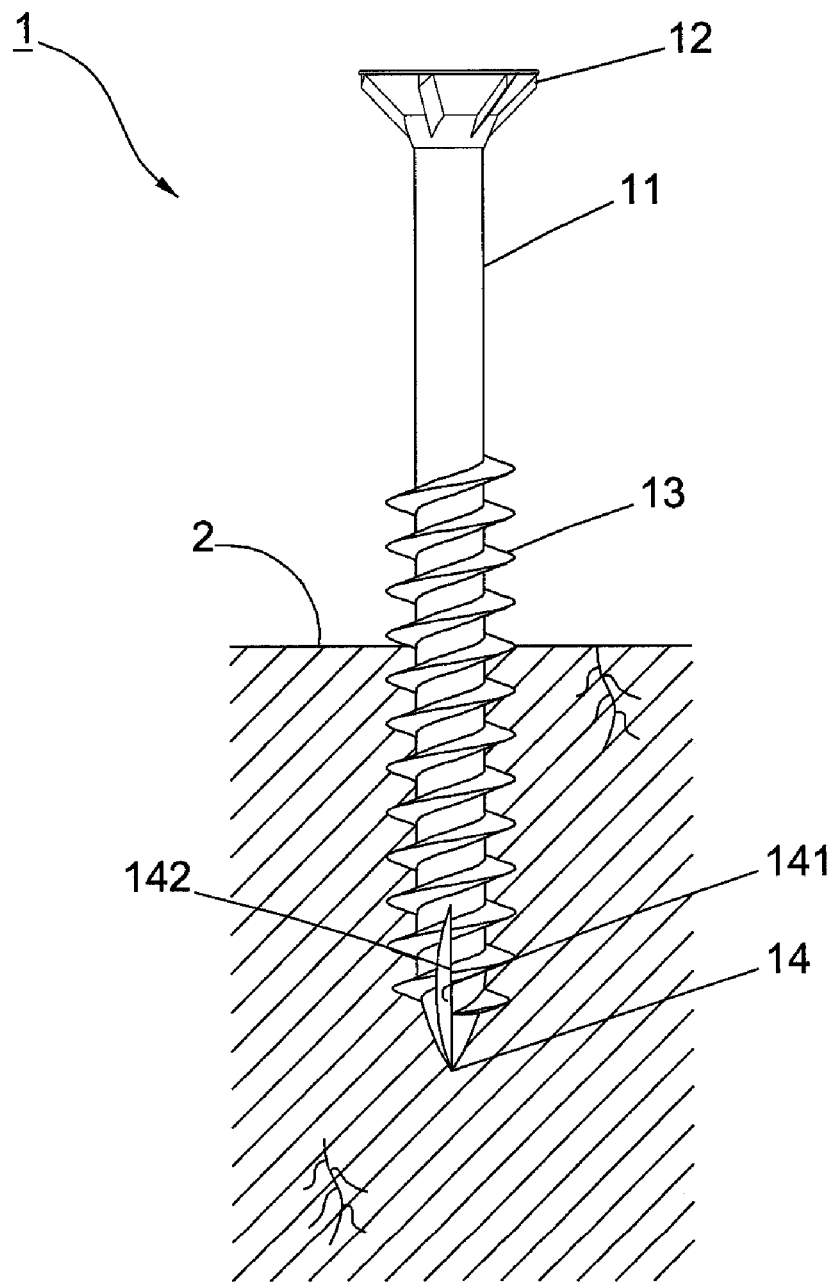
FIG. 1 is a schematic view showing a conventional screw.
Figure 2:
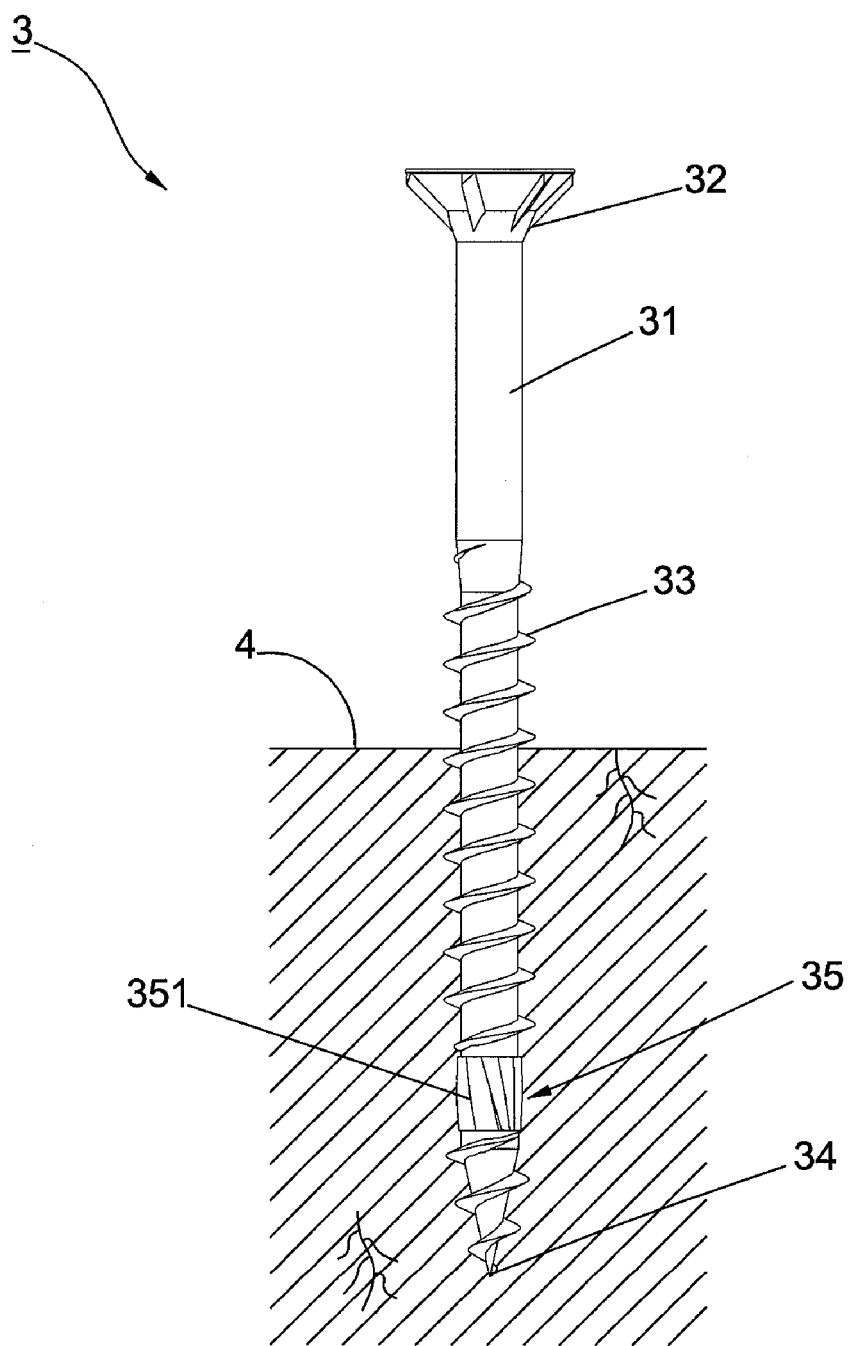
FIG. 2 is a schematic view showing another conventional screw.

Before describing the invention in greater detail, it should be noted that the like elements are denoted by similar reference numerals throughout the disclosure.

Figure 3:
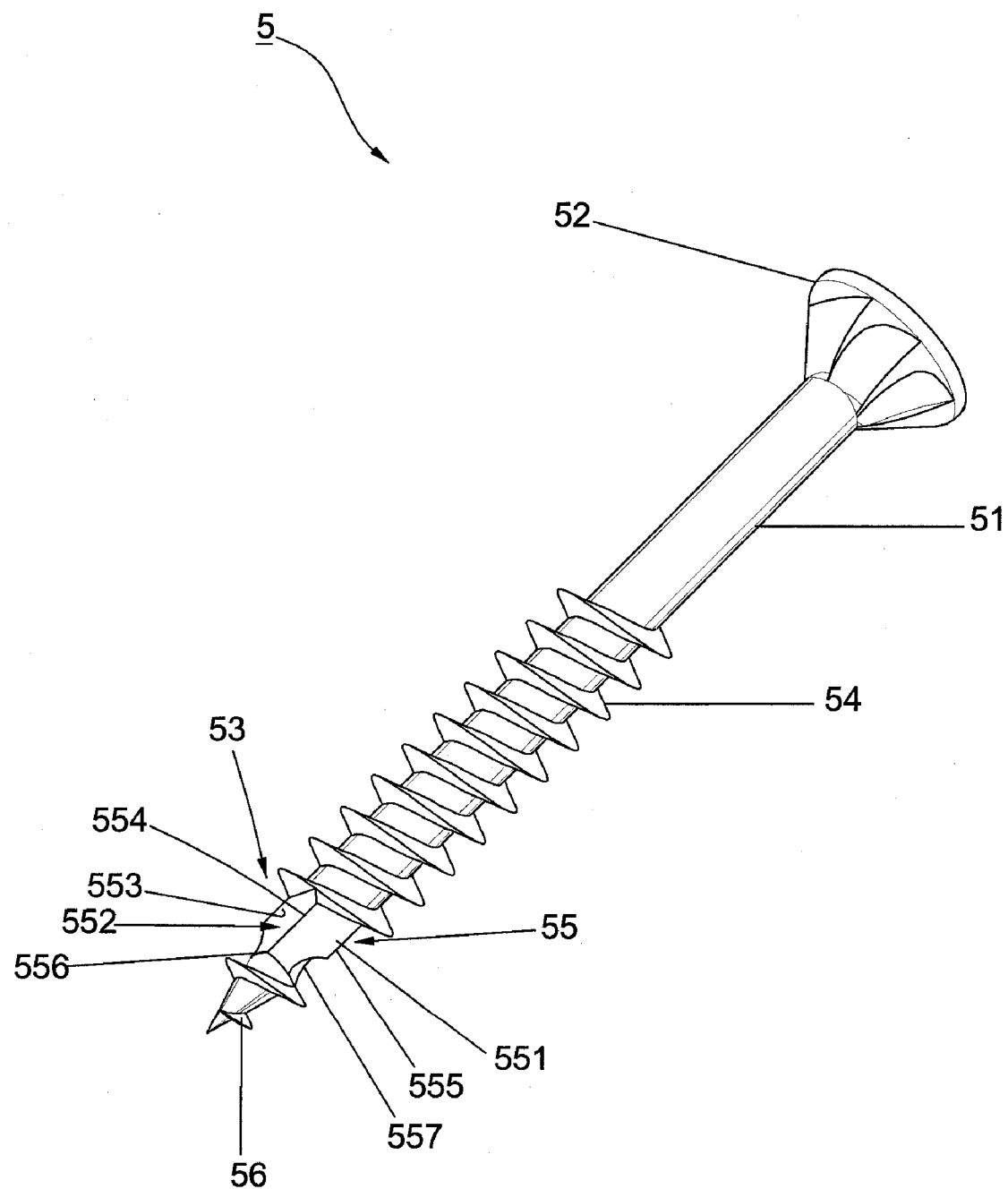
FIG. 3 is a schematic view showing a first preferred embodiment of the present invention.

FIG. 3 shows a first preferred embodiment of the present invention. A versatile fastener 5 comprises a shank 51, a head portion 52 and a drill point 53 respectively disposed at two opposite ends of the shank 51, and a threaded section 54 spirally disposed on the shank 51. A cutting part 55 with no threaded portion disposed thereon is formed on the drill point 53, and at least one leading thread 56 extends outwardly from the cutting part 55. By forming the cutting part 55 through direct punching, a higher strength of the cutting part 55 can be accomplished.

Figure 4:
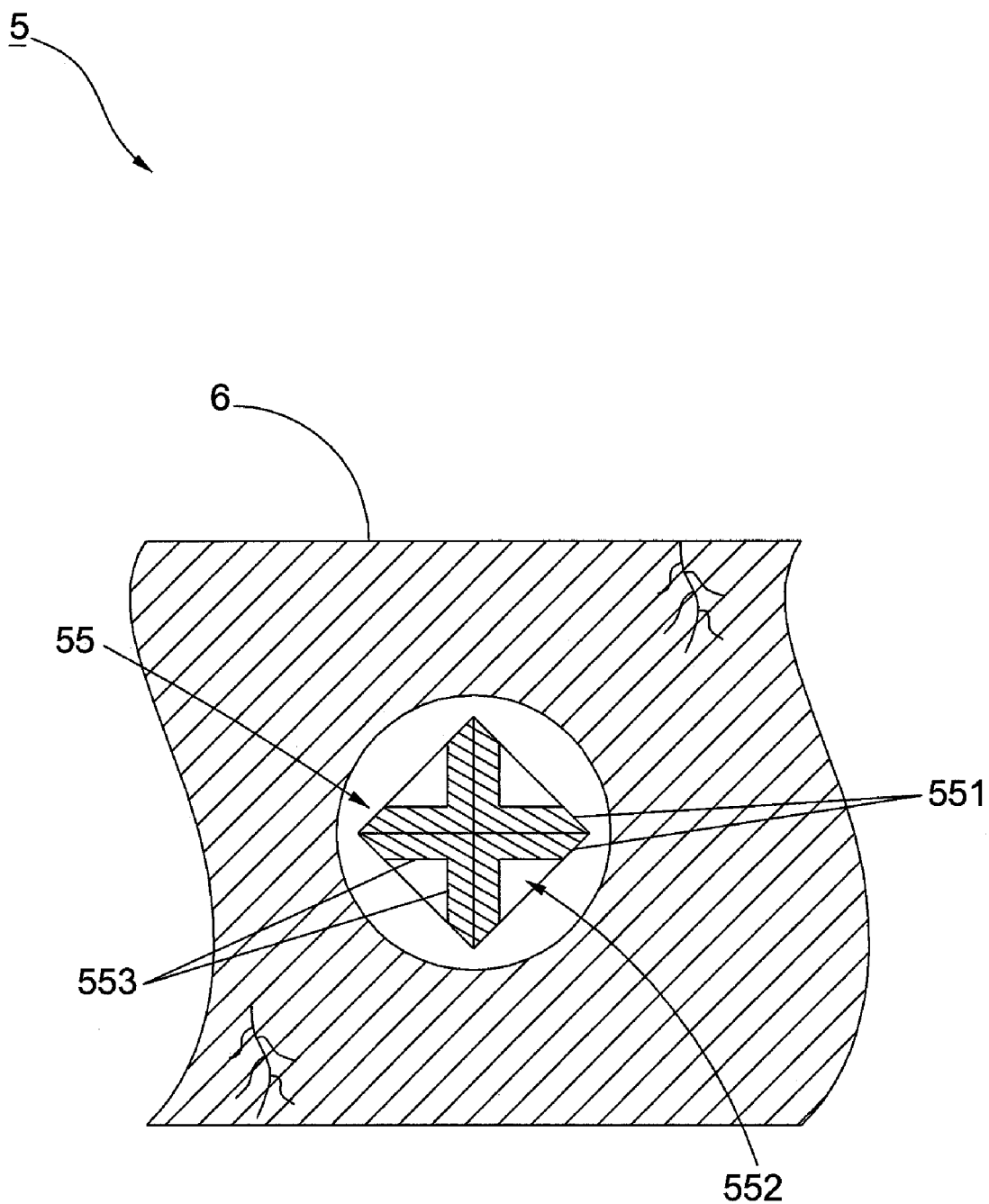
FIG. 4 is a bottom cross-sectional view showing a second preferred embodiment of the present invention.
Figure 6:
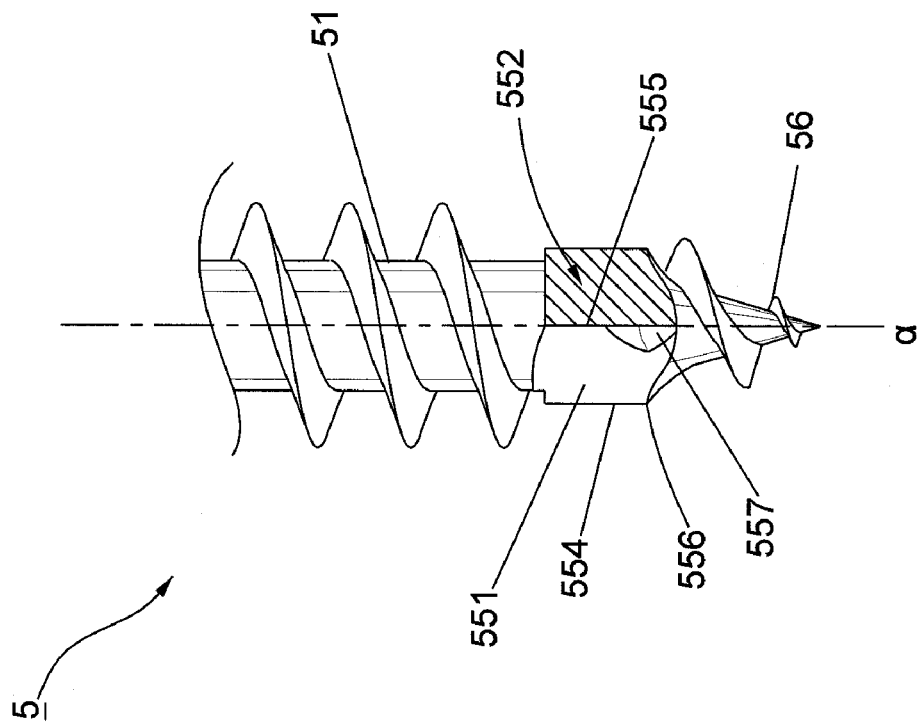
FIGS. 5 and 6 are partial cross-sectional views showing the first preferred embodiment.
Figure 5:
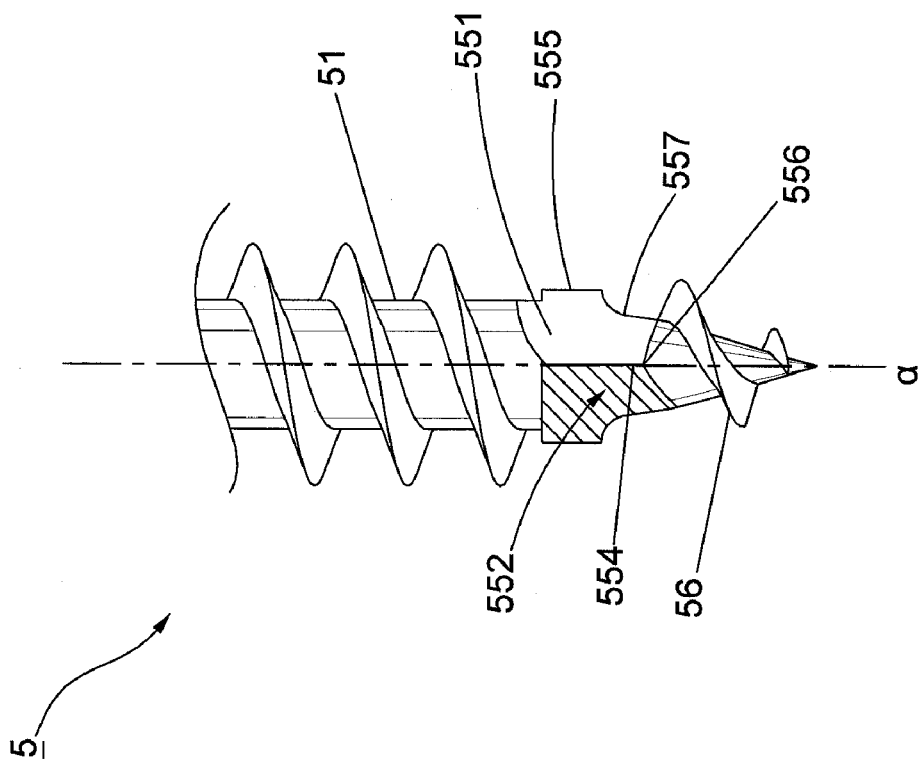
Figure 9:
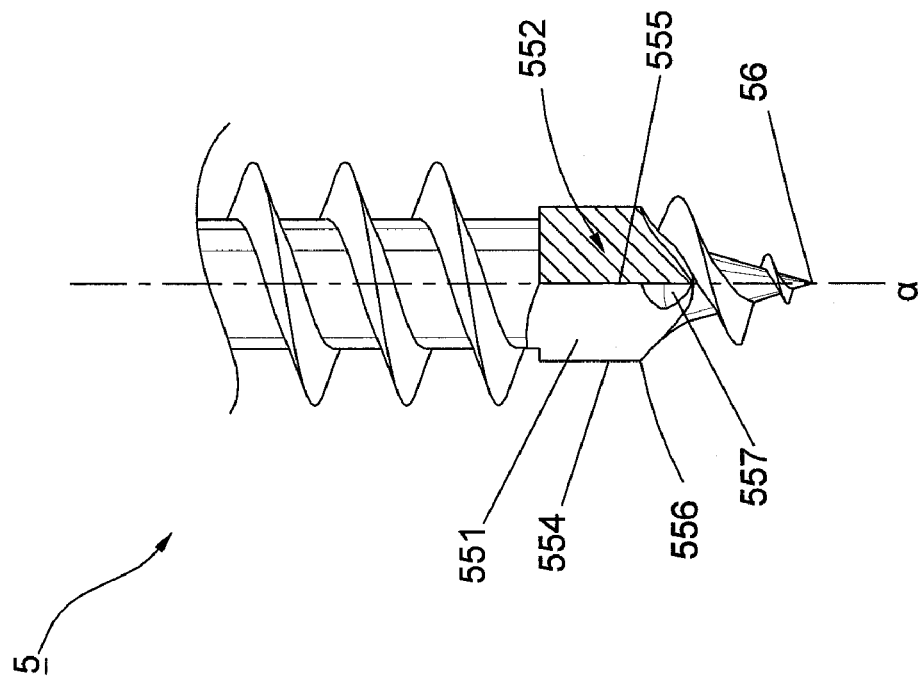
FIGS. 8 and 9 are other partial cross-sectional views showing the first preferred embodiment.
Figure 8:
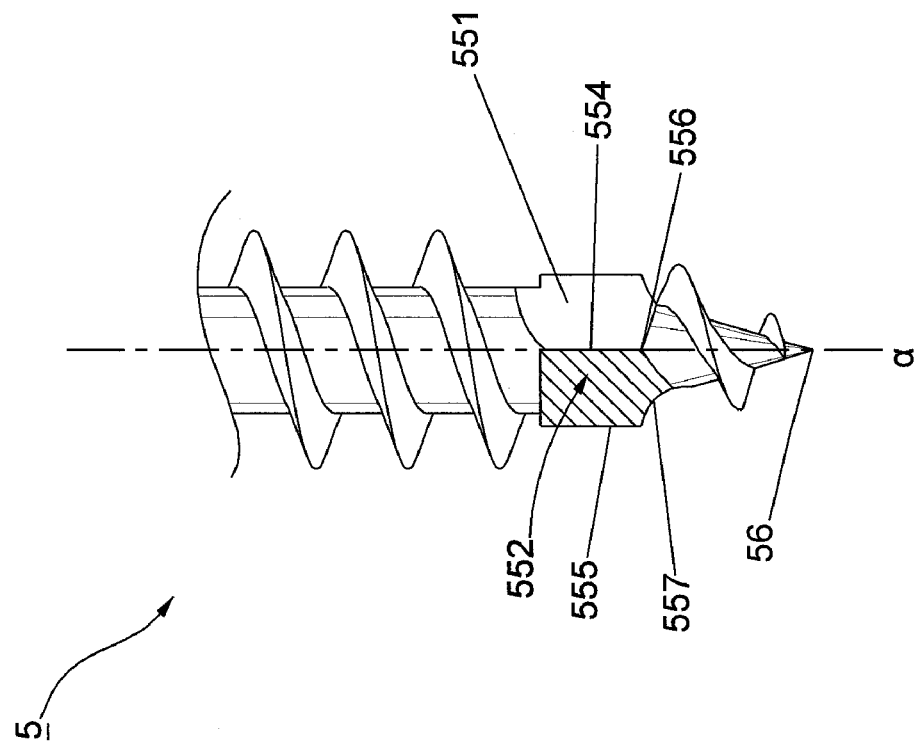

Further, the cutting part 55 includes at least two flat areas 551 and an accommodating area 552 defined between any two of the flat areas 551 at intervals. The cutting part 55 could alternatively include several flat areas 551 as shown in FIG. 4. In this embodiment, the cutting part 55 adopts two flat areas 551 as well as one accommodating area 552 disposed between any two of the flat areas 551 at regular intervals. In addition, the accommodating area 552 has at least two connective cutting faces 553. A first cutting edge 554 and a second cutting edge 555 are respectively formed at a convergence of each of the cutting faces 553 and the flat areas 551. Specifically, a junction formed by at least two cutting faces 553 on the accommodating area 552 is correspondingly disposed to an axis a (as indicated by an imaginary line) of the shank 51. Further, a pointed part 556 (as shown in FIG. 5) is formed at a congregation of the first cutting edge 554 and the leading thread 56. Herein, a guiding area 557 (as shown in FIG. 6) is defined where the second cutting edge 555 and the leading thread 56 meet. In connection with the above concatenation, the pointed part 556 and the guiding area 557 are not set in the same level, thereby allowing the lengths of the first cutting edge 554 and the second cutting edge 555 to be divergent. Alternatively, as shown in FIGS. 8 and 9, the lengths of the first cutting edge 554 and the second cutting edge 555 are identical in view of the pointed part 556 and the guiding area 557 being set in the same level. In this embodiment, the disposition of the cutting edges 554, 555 shown in FIGS. 5 and 6 is herein described as an example.

Figure 7:
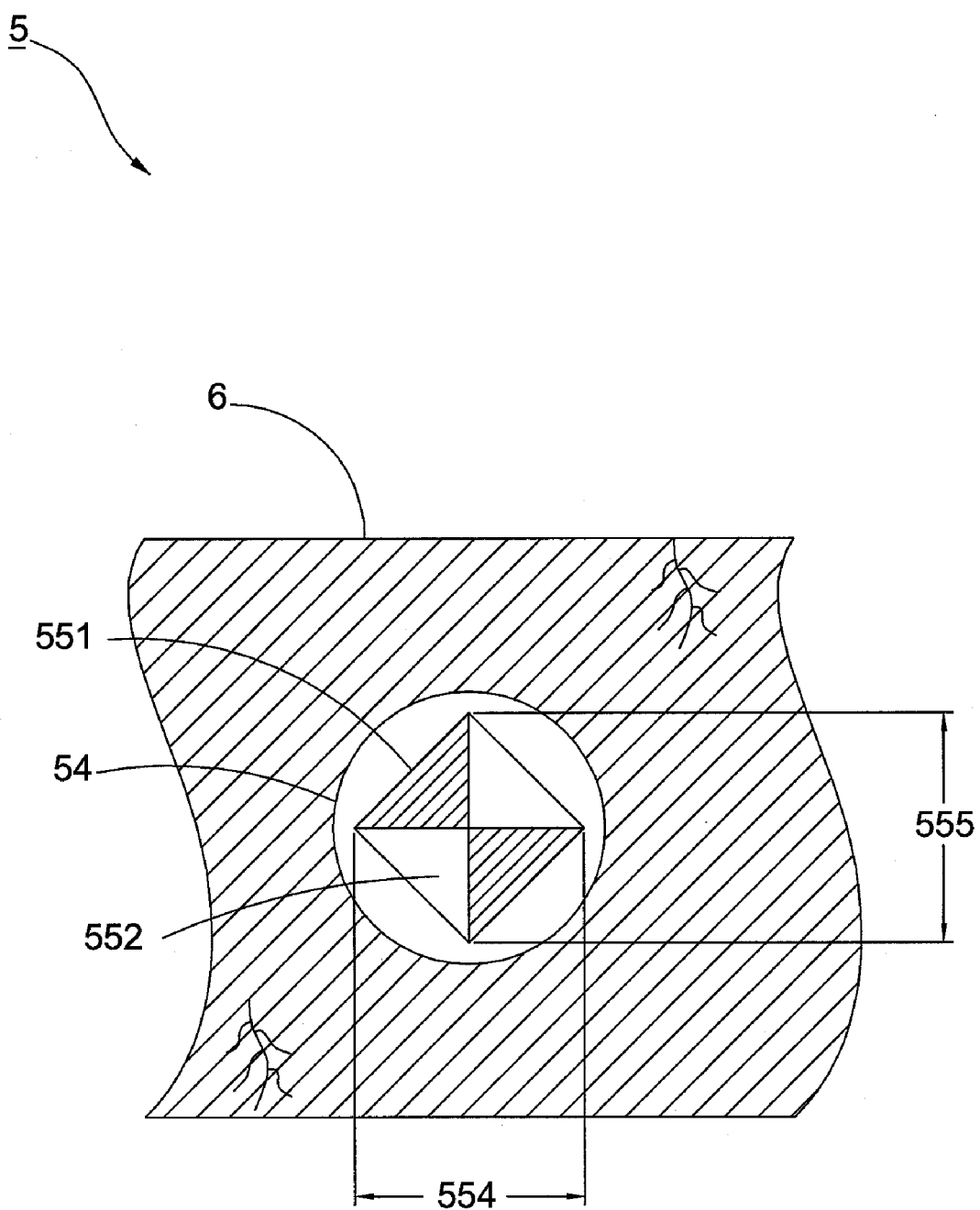
FIG. 7 is a bottom cross-sectional view showing the first preferred embodiment in using.

Referring to FIGS. 5 to 7, in fastening, the leading thread 56 is set against an object 6, thence permitting imparting an exertion on the head portion 52 (not shown) for the leading thread 56 to carry on the succeeding drilling of the fastener 5. During the succeeding drilling, the pointed part 556 and the guiding area 557 respectively defined on the flat areas 551 are able to guide the debris generated from chipping out of the accommodating area 552. Concurrently, the first and second cutting edges 554, 555 are gradually drilled into the object 6. Herein, since the flat areas 551 provide a rather large supporting area between the object 6 and the fastener 5, a more steady balance therebetween could be preferably carried out while the first and second cutting edges 554, 555 are continuously drilled into the object 6. Thus, the fastener 5 within the object 6 does not sway randomly. Simultaneously, as the debris generated while screwing is swiftly expelled from the accommodating area 552, the fastener 5 does not easily crack in view of the consecutively compressed debris and the swayed drilling. Thus, the steady supporting effect allows the fastener 5 and the object 6 to hold a preferable balance therebetween, thence bringing about a promoted fastening speed, a lowered fastening torque, and an elevated fastening effect.

Figure 10:
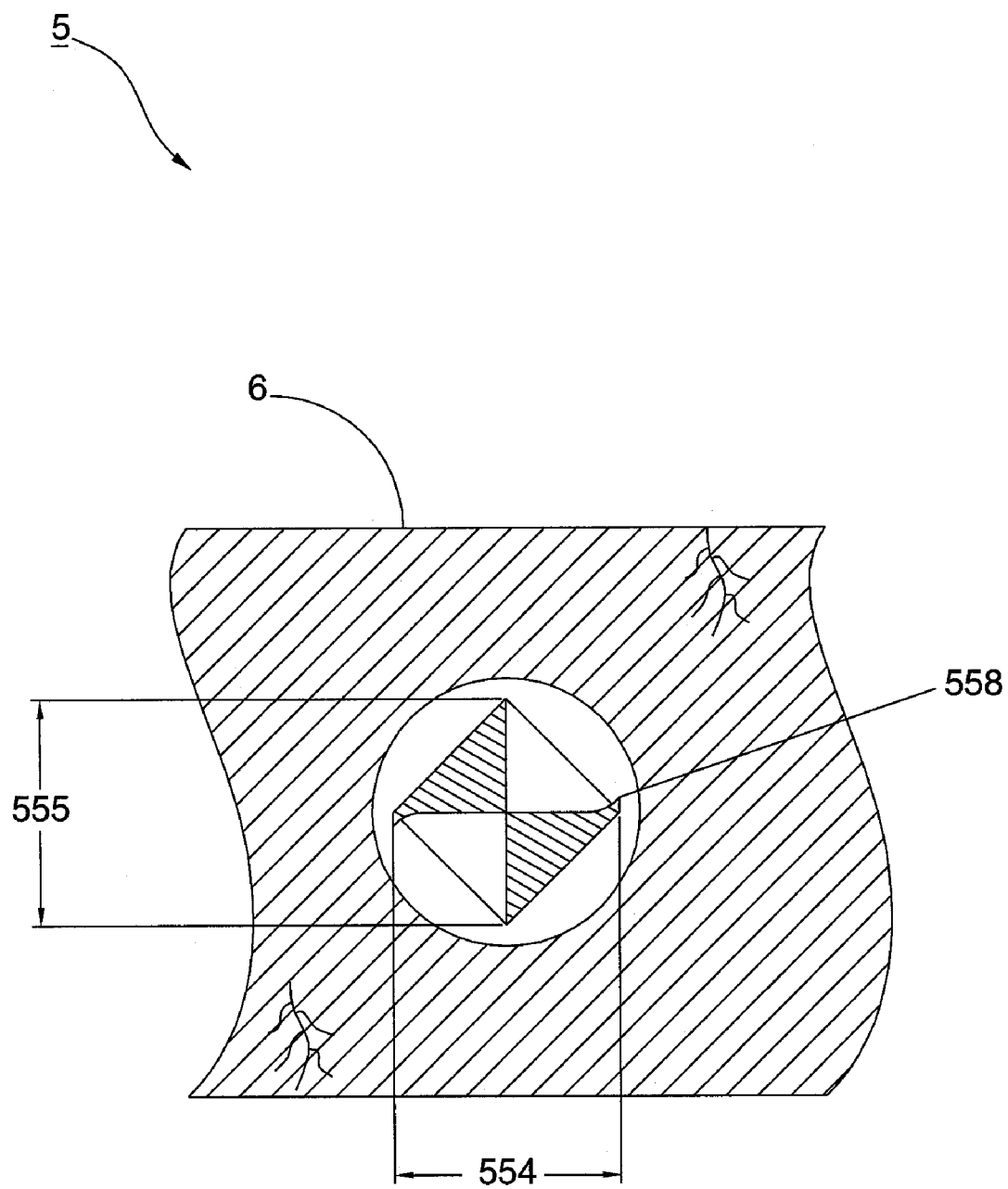
FIG. 10 is a bottom cross-sectional view showing a third preferred embodiment of the present invention.

Referring to FIG. 10, a third preferred embodiment of the present invention is shown similar to that disclosed in the first preferred embodiment. Differently, an auxiliary cutting edge 558 could be extensively formed on brims of the first cutting edge 554 and of the second cutting edge 555, respectively. In this embodiment, the auxiliary cutting edge 558 is extensively formed on the first cutting edge 554. Accordingly, such an auxiliary cutting edge 558 allow easier drilling and thereby provides a steady fixing effect as well as preventing the object 6 from cracking.

Figure 12:
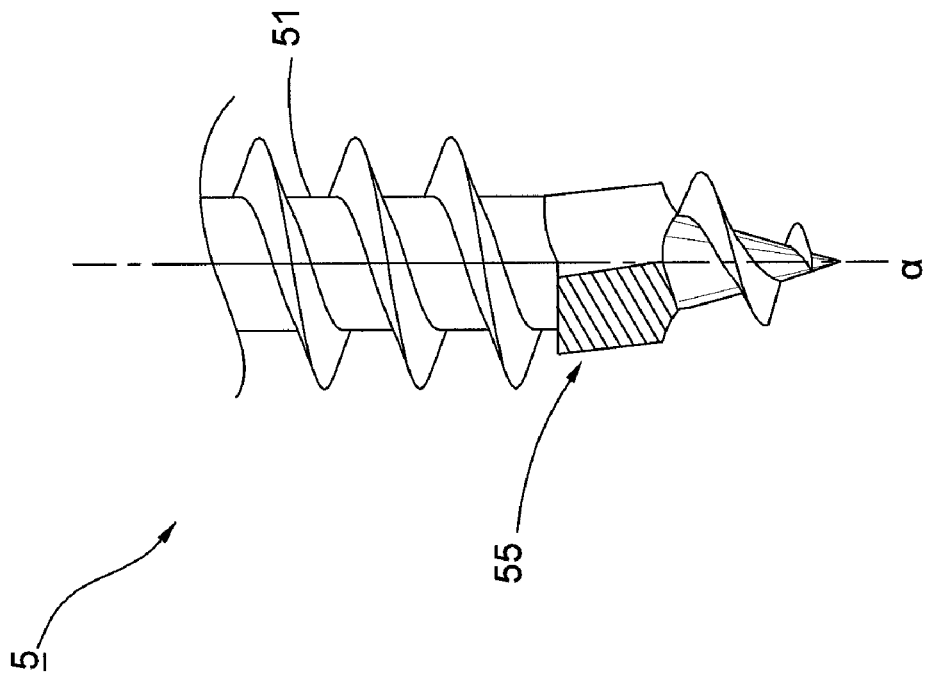
FIGS. 11 and 12 are partial cross-sectional views showing a fourth preferred embodiment of the present invention.
Figure 11:
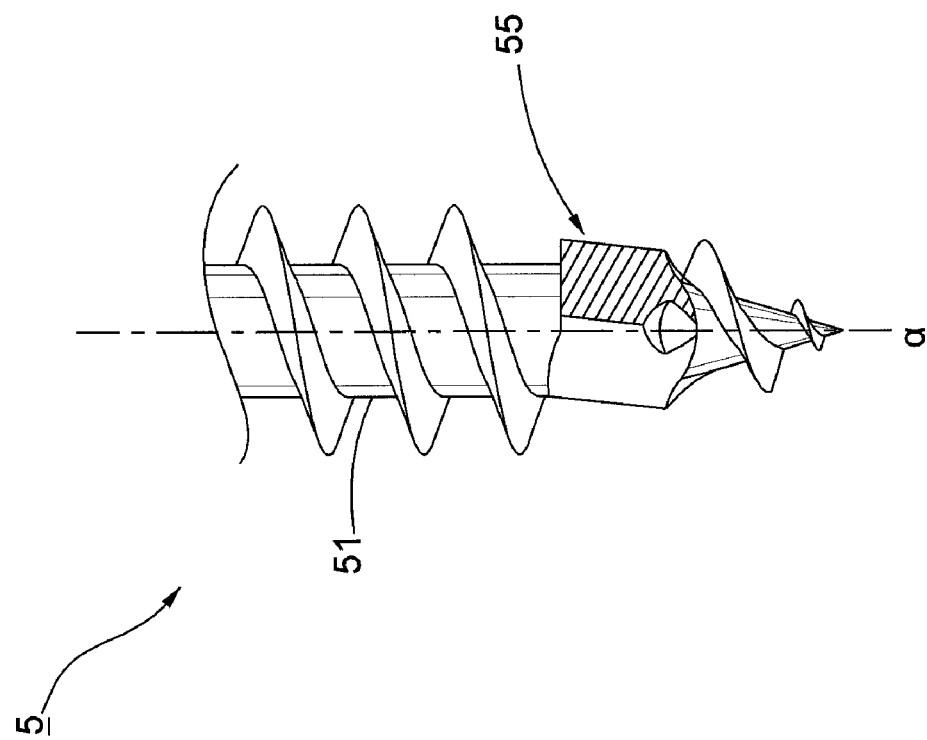

FIGS. 11 and 12 show a fourth preferred embodiment of the present invention similar to that disclosed in the first preferred embodiment. Especially, the cutting part 55 is designed as being inclined with respect to an axis a of the shank 51. Accordingly, the present invention still provides a stable balance between the fastener and the object as well as avoids the object from cracking.

Figure 14:
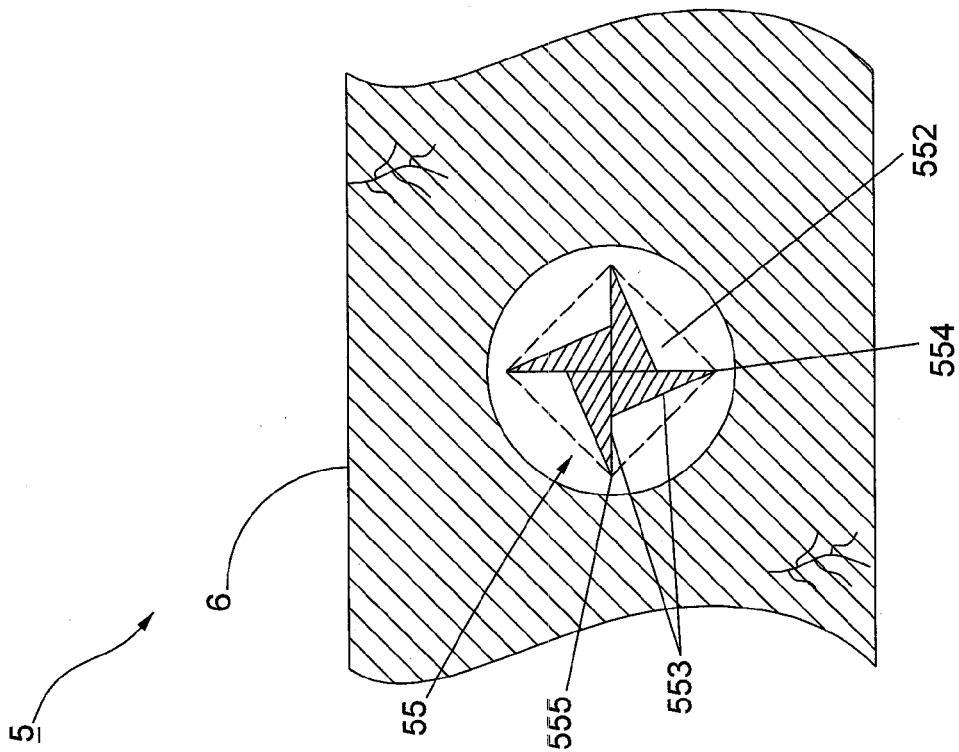
FIGS. 13 and 14 are partial bottom cross-sectional views showing a fifth preferred embodiment of the present invention.
Figure 13:
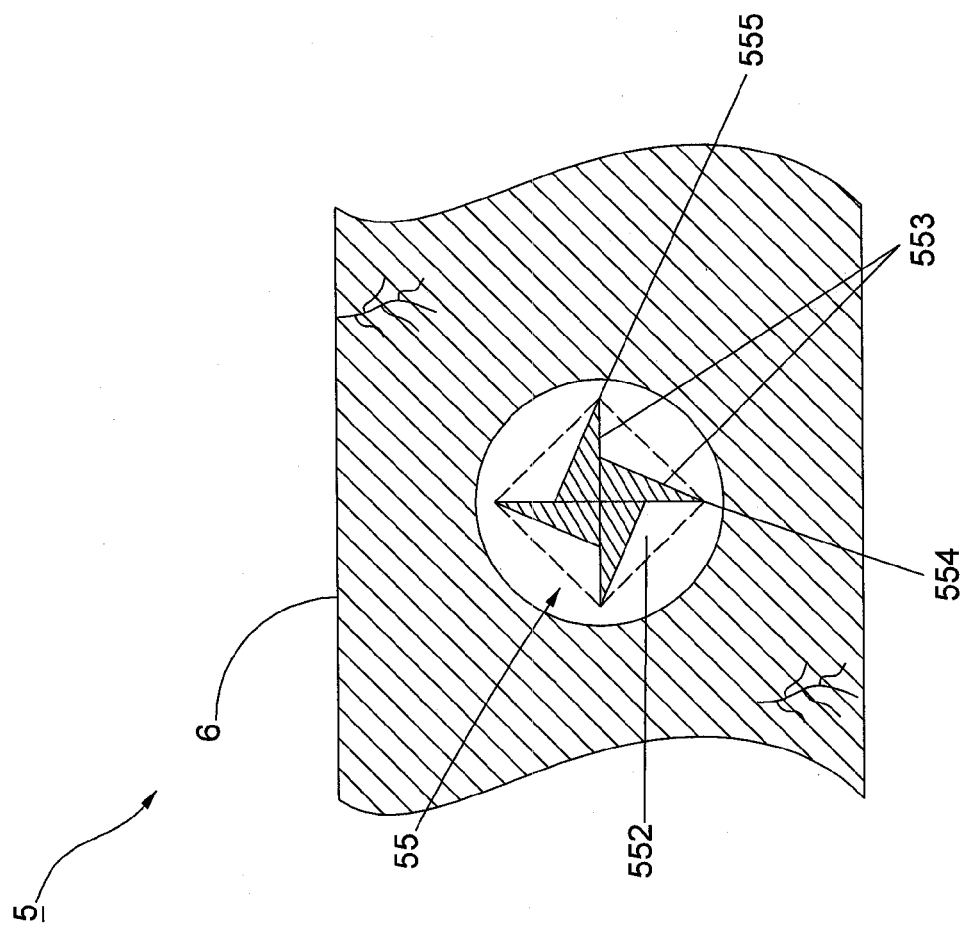

FIGS. 13 and 14 show a fifth preferred embodiment of the present invention whose related elements are defined alike to those in the first preferred embodiment. Differently, the convergence formed of the at least two cutting faces 553 of the accommodating area 552 is inconsistently disposed with respect to the axis a of the shank 51 (the axis is not herein shown). Thereby, the first and second cutting edges 554, 555 and the axis a of the shank 51 could be disposed either toward the clockwise or counterclockwise directions. Therefore, by means of the cutting faces 553 rendering the cutting parts 55 able to set into different schemes, the fastener 5 favorably achieves a stable fixing effect and prevents the object 6 from cracking.

Figure 15:
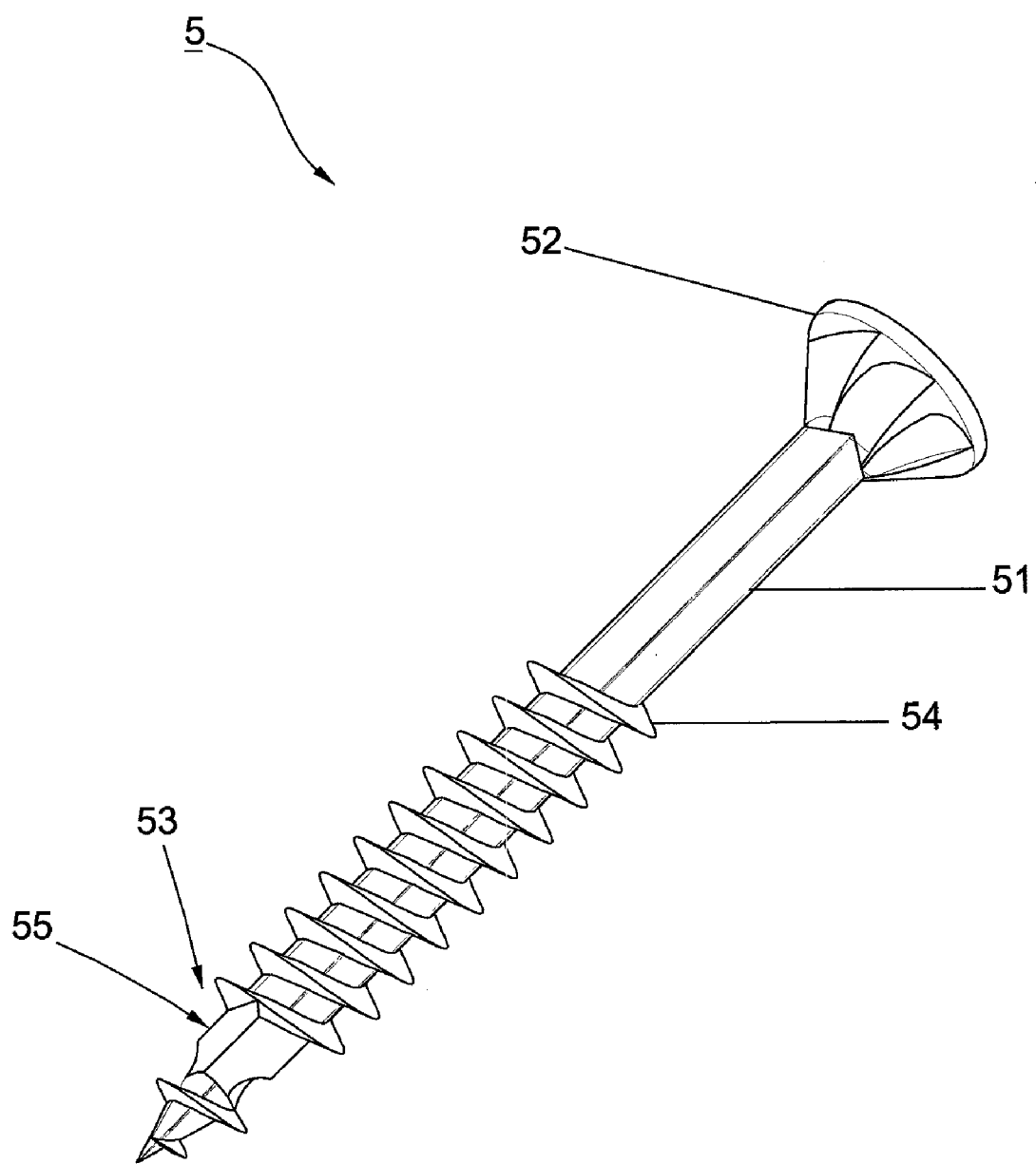
FIG. 15 is a schematic view showing a sixth preferred embodiment of the present invention.

Referring to FIG. 15, a sixth preferred embodiment of the present invention substantially comprises the shank 51, the head portion 52, the drill point 53, the threaded portion 54, and the cutting part 55. Wherein, the fastening effect and the crack prevention effect are similar to those disclosed in the previous embodiments. Specifically, the shank 51 in this embodiment is designed as a polygon contour, and in the Figures the shank 51 is a quadrilateral. Therefore, since the shank 51 is able to adopt multiple designs, a rather large accommodating room for receiving debris could be provided at the time of screwing. Accordingly, the fastening resistance is decreased, thereby preventing the object from splitting in view of the redundant debris adversely retained in the accommodating area. As a result, even if the fastener 5 is applied to an elastic material or a wood material, a densely fastening effect could be favorably achieved.

Figure 16:
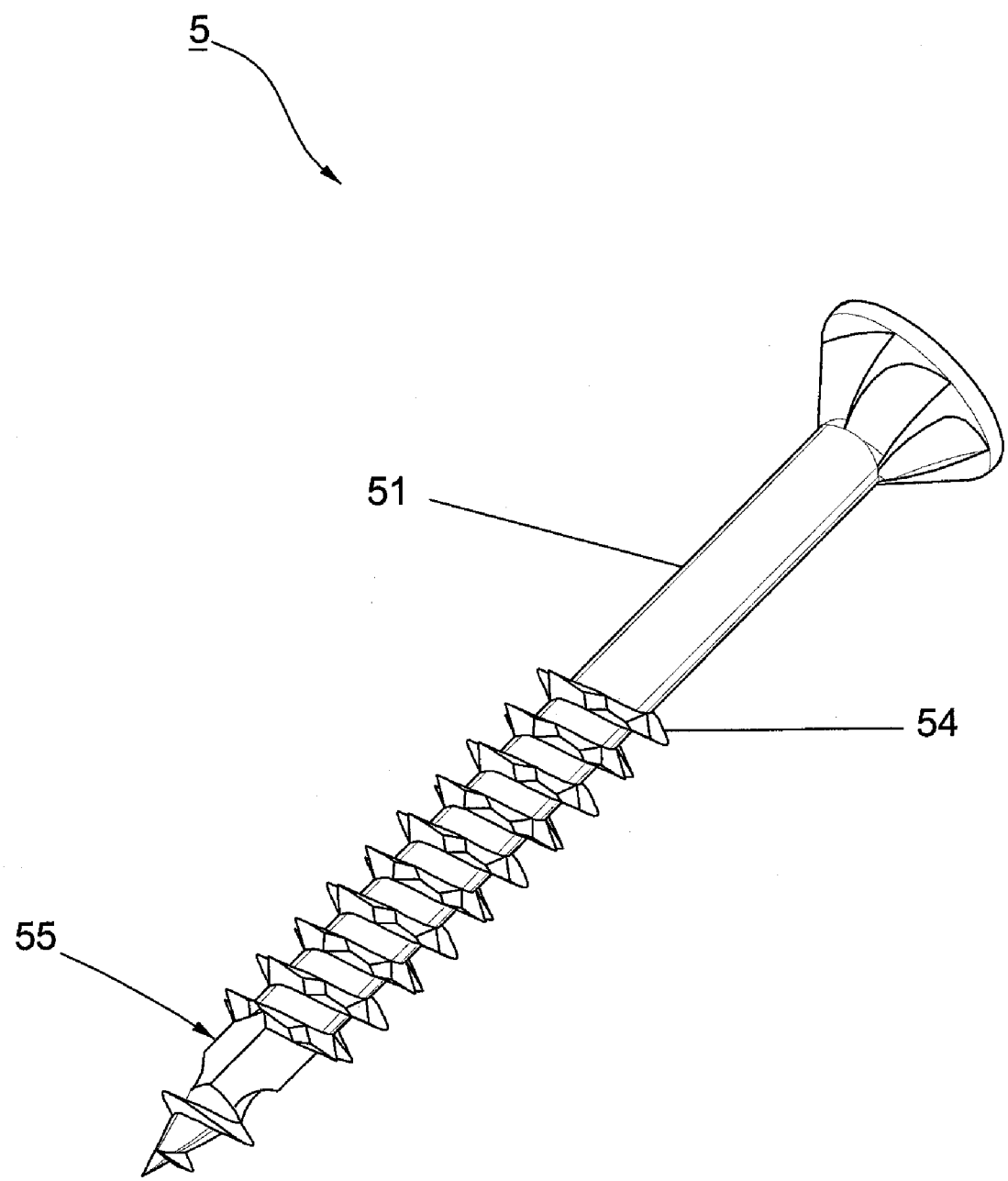
FIG. 16 is a schematic view showing a seventh preferred embodiment of the present invention.
Figure 17:
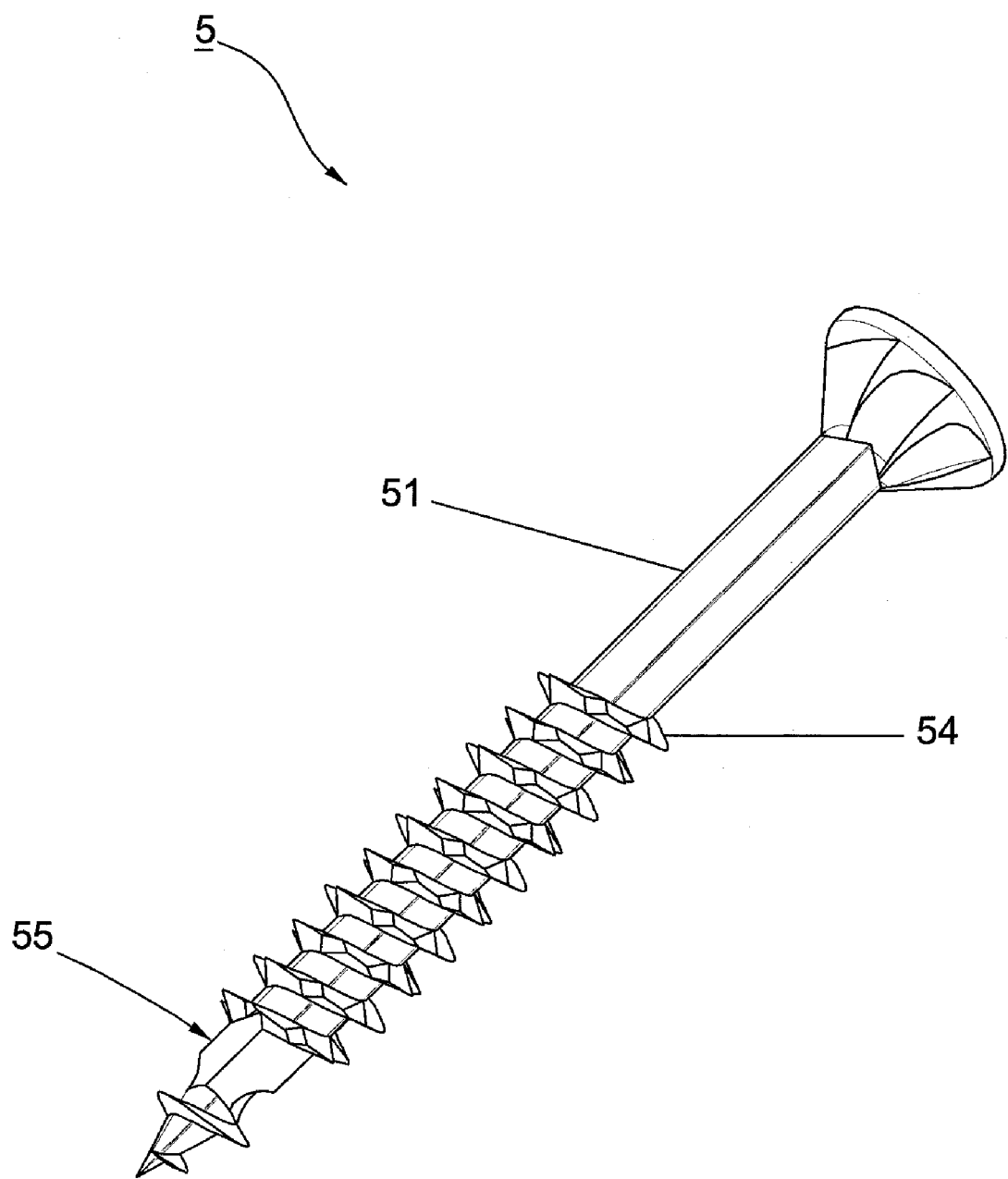
FIG. 17 is a schematic view showing an eighth preferred embodiment of the present invention.

Referring to FIG. 16, a seventh preferred embodiment is shown. In this embodiment, the fastener 5 still comprises the similar elements, relations, and efficiencies as those disclosed in previous embodiments. Differently, the threaded portion 54 in this embodiment is designed as a polygon. Alternatively, both the shank 51 and the threaded portion 54 are designed as a polygon structure as shown in FIG. 17. It is noted that no matter how the shank 51 and the threaded portion 54 are configured, the threaded portion 54 consecutively provides the cutting part 55 with a stable cutting effect. Thereby, a prompt and less laborious fastening result could be still accomplished, and the debris would not be piled up in the accommodating area, which avoids the object from cracking.

Figure 18:
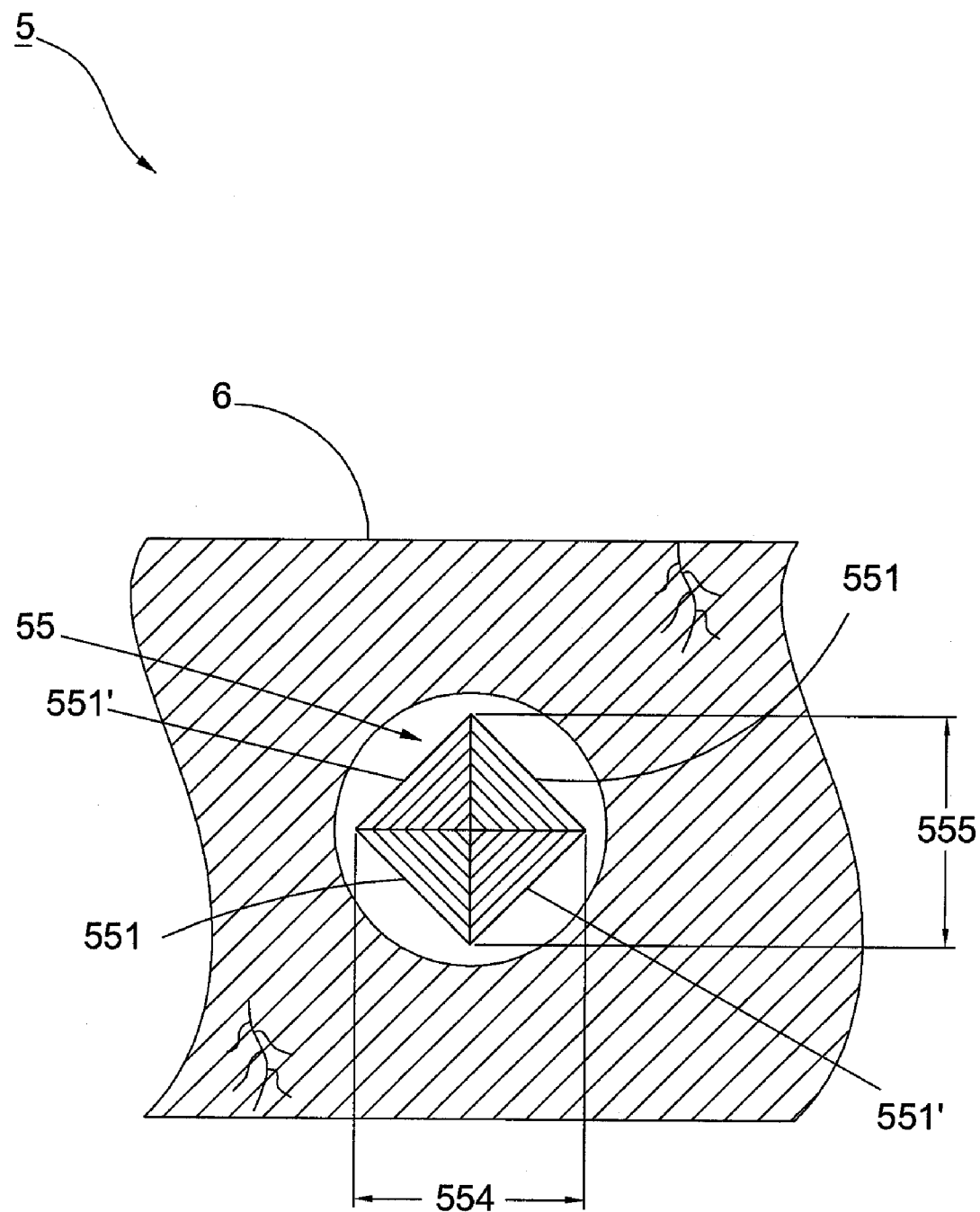
FIG. 18 is a bottom cross-sectional view showing a ninth preferred embodiment of the present invention.

Referring to FIG. 18, a ninth preferred embodiment of the present invention still includes most of the structures as those mentioned in the first embodiment. It is characterized in that the cutting part 55 has at least two first flat areas 551 and a second flat area 551' disposed between any two of the first areas 551. Herein, a first cutting edge 554 as well as a second cutting edge 555 is respectively disposed on a convergence of each first flat area 551 and adjacent second flat area 551'. Moreover, the first cutting edge 554 and the second cutting edge 555 are designed in different lengths. Alternatively, accompanying with FIGS. 5 and 6 as well as 8 and 9, a pointed part 556 is connectively formed by the first cutting edge 554 and the leading thread 56, and a guiding area 557 is also defined at a junction formed by the second cutting edge 555 and the leading thread 56. Thereby, the first and second cutting edges 554, 555 designed in divergent lengths permit the cutting part 55 to render the versatile fastener 5 able to attain a stable fastening efficiency as well as a crack prevention function.

To sum up, the present invention takes advantage of the cutting part provided with at least two flat areas as well as an accommodating area disposed between the flat areas at intervals. Whereby, a stable supporting is conduced between the fastener and the object for the purpose of avoiding the swaying generated from the insufficient supporting force. Further, the instant guidance of the debris through the accommodating area also prevents the object from being cracked due to the jam of the debris. Therefore, the present invention facilitates promoting the fastening speed and the screwing efficiency as well as decreasing the screwing torque.

While we have shown and described the embodiment in accordance with the present invention, it should be clear to those skilled in the art that further embodiments may be made without departing from the scope of the present invention.

I claim:

1. A versatile fastener comprising a shank, a head portion at one side thereof, a drill point disposed opposite to said head portion extending to a distal end of said shank, and a threaded portion spirally disposed on said shank and extending to a beginning of said drill point; wherein, said drill point including a cutting part with no spiral thread disposed thereon, following said threaded portion and extending adjacently to said distal end of said shank and at least one leading thread extending outwardly from said cutting part, said leading thread being located between said cutting part and said distal end for a leading driving into an object;

wherein, said cutting part having at least two flat areas extending from said threaded portion to a beginning of said leading thread and an accommodating area in the form of a recess disposed between any two of said flat areas; said accommodating area being formed by at least two cutting faces connected with each other, and a first cutting edge as well as a second cutting edge being respectively disposed on a convergence of each cutting face and each flat area so that said adjacent flat areas are spaced by said accommodation area for providing a holding capability of said two cutting edges with said object and guiding debris out;

wherein, a pointed part is formed at a junction between said first cutting edge and said leading thread and, a guiding area is defined at a meeting of said second cutting edge and said leading thread to attain a connection between said cutting part and said leading thread, facilitating the cutting capability and the removal of debris.

2. The versatile fastener as claimed in claim 1, wherein said first cutting edge and said second cutting edge are formed with different lengths.

3. The versatile fastener as claimed in claim 1, wherein, at least two cutting faces of said accommodation area are correspondingly disposed to an axis of said shank.

4. The versatile fastener as claimed in claim 2, wherein, at least two cutting faces of said accommodation area are correspondingly disposed to an axis of said shank.

5. The versatile fastener as claimed in claim 1, wherein, at least two cutting faces of said accommodation area are not correspondingly disposed to an axis of said shank.

6. The versatile fastener as claimed in claim 2, wherein, at least two cutting faces of said accommodation area are not correspondingly disposed to an axis of said shank.

7. The versatile fastener as claimed in claim 1, wherein, said cutting part is inclined with respect to an axis of said shank.

8. The versatile fastener as claimed in claim 2, wherein, said cutting part is inclined with respect to an axis of said shank.

9. The versatile fastener as claimed in claim 1, wherein, said shank and said threaded portion are formed by a polygon contour.

10. The versatile fastener as claimed in claim 2, wherein, said shank and said threaded portion are formed by a polygon contour.

11. The versatile fastener as claimed in claim 1, wherein, an auxiliary cutting edge is formed on brims of said first cutting edge and of said second cutting edge, respectively.

12. A versatile fastener comprising a shank, a head portion at one side thereof, a drill point disposed opposite to said head portion extending to a distal end of said shank, and a threaded portion spirally disposed on said shank and extending to a beginning of said drill point; wherein, said drill point including a cutting part with no spiral thread disposed thereon, following said threaded portion and extending adjacently to said distal end of said shank and at least one leading thread extending outwardly from said cutting part, said leading thread being located between said cutting part and said distal end for a leading driving into an object;

wherein, said cutting part having at least two first flat areas and a second flat area disposed between any two of said first flat areas; wherein, a first cutting edge as well as a second cutting edge being respectively disposed on a convergence of each first flat area and adjacent second flat area; said first cutting edge and said second cutting edge being designed by different lengths, providing a holding capability of said two cutting edges with said object and guiding debris out;

wherein, a pointed part is connectively formed by said first cutting edge and said leading thread and a guiding area is defined at a junction formed by said second cutting edge and said leading thread to attain a connection between said cutting part and said leading thread, facilitating the cutting capability and the removal of debris.

* * * * *